Figures 1, 2, 3:
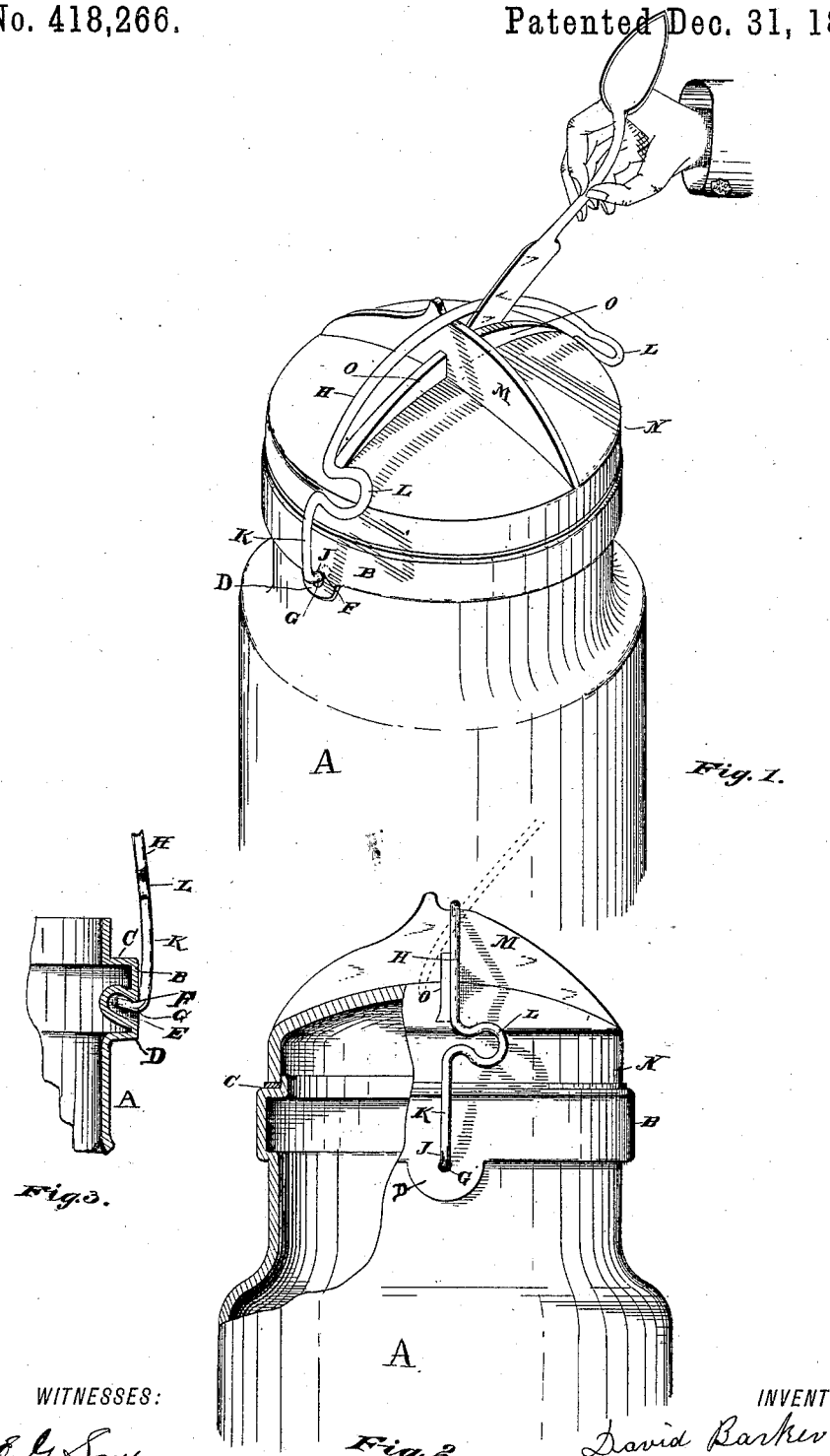

(No Model.)

D. BARKER.
FRUIT JAR.

No. 418,266. Patented Dec. 31, 1889.

WITNESSES:
E. G. Saul
Attee Pomerene

INVENTOR
David Barker
BY
W. K. Miller
ATTORNEY

UNITED STATES PATENT OFFICE.

DAVID BARKER, OF CANTON, OHIO, ASSIGNOR TO THE CANTON GLASS COMPANY, OF SAME PLACE.

FRUIT-JAR.

SPECIFICATION forming part of Letters Patent No. 418,266, dated December 31, 1889.

Application filed July 12, 1889. Serial No. 317,293. (No model.)

*To all whom it may concern:*

Be it known that I, DAVID BARKER, a citizen of the United States, and a resident of Canton, county of Stark, State of Ohio, have invented a new and useful Improvement in Fruit-Jars, of which the following is a full, clear, and exact description, reference being had to the accompanying drawings, making part of this specification.

My invention relates to improvements in fruit-jars, the object of which is to simplify and reduce the cost of construction without impairing its efficiency.

With these ends in view my invention consists in certain features of construction and combinations of parts, as will be hereinafter described, and set forth in the claim.

Figure 1 of the accompanying drawings is a view in perspective of a fruit-jar, illustrating my invention. Fig. 2 is a side elevation, partly sectional. Fig. 3 is a sectional view of a fragment of the jar through the bail-socket, showing the detail of the manner of securing the spring-bail to the jar.

Similar letters of reference indicate corresponding parts in all of the figures of the drawings.

A represents the body of the jar, which is preferably made of glass. At the upper end portion is formed a collar B, forming a shoulder, as C, and ears D, in which there is formed an inwardly and upwardly projected socket E, as shown in cross-section in Fig. 3, the object of which is to provide a bearing, as F, for the journal portion of G of the bail H on the outside or wall portion of the collar B and ear D, by which a strong and reliable journal-bearing is secured for the journal G of the bail, and the liability to break through the socket avoided, as would be the case if the end of the journal pressed against the bottom portion of the socket, the draft of the mold forming the socket being necessarily such as to taper the socket inwardly, which form would bring the pressure of the end of bail-journal against the inside upper portion of the socket, in which case the liability to break through the socket is very great; but by turning the inner end portion slightly upward and away from the end of the wire forming the bail the difficulty is entirely removed and the pressure on the bail-journal brought near the sides of the bail and on the outside portion or wall of the jar. The journal portions G of the bail are turned inwardly, as shown, and at right angles with the shank portion K, and between the vertical shank portion K and the top portion of the bail the wire forming the bail is turned to one side and over and back in line with the shank aforesaid, thus forming a C-spring L, as shown in the drawings, by the elasticity of which the top portion of the bail may be raised over and upon the arched-rib portion M of the cap N, the energy of the spring holding cap down on the shoulder C. The cap is further provided with ribs O, which serve to strengthen the cap and also as a fulcrum over which a pry may be used to force the bail over the arched flange M, as shown in the drawings.

Having thus fully described the nature and object of my invention, what I claim, and desire to secure by Letters Patent, is—

The combination, with a jar having an annular outwardly-projected collar portion forming a seat for the cap and provided with inwardly and upwardly extending sockets located at opposite points in the collar, of a bail having at its ends inwardly and upwardly inclined journals to engage the sockets, and having laterally-bent portions intermediate its ends to give elasticity, and a cap having an arched rib for engaging the bail, and a rib at an angle to the said arched engaging rib, substantially as set forth.

In testimony whereof I have hereunto set my hand this 25th day of June, A. D. 1889.

DAVID BARKER.

Witnesses:
W. K. MILLER,
ATLEE POMEREUX.